(12) United States Patent
Pasupuleti (10) Patent No.: US 10,536,505 B2
(45) Date of Patent: Jan. 14, 2020

(54) INTELLIGENT DATA TRANSMISSION BY NETWORK DEVICE AGENT

(71) Applicant: AppDynamics LLC, San Francisco, CA (US)

(72) Inventor: Srinivas Pasupuleti, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,694

(22) Filed: Apr. 30, 2017

(65) Prior Publication Data

US 2018/0316743 A1 Nov. 1, 2018

(51) Int. Cl.
*H04L 12/24* (2006.01)
*H04L 29/08* (2006.01)
*H04L 12/26* (2006.01)

(52) U.S. Cl.
CPC ........ *H04L 67/025* (2013.01); *H04L 41/0681* (2013.01); *H04L 41/142* (2013.01); *H04L 41/145* (2013.01); *H04L 43/04* (2013.01)

(58) Field of Classification Search
CPC .... G06F 11/008; H04L 41/145; H04L 41/147; H04L 41/16
See application file for complete search history.

(56) References Cited

U.S. PATENT DOCUMENTS

| | | | | |
|---|---|---|---|---|
| 8,407,306 | B1* | 3/2013 | Nerieri | H04L 12/6418 709/206 |
| 8,438,248 | B2* | 5/2013 | Li | H04L 41/0816 709/203 |
| 9,509,529 | B1* | 11/2016 | McAllister | H04L 51/30 |
| 9,781,607 | B2* | 10/2017 | Rath | H04W 16/18 |
| 10,168,953 | B1* | 1/2019 | Gupta | G06F 3/0659 |
| 10,389,738 | B2* | 8/2019 | Muddu | G06F 3/0482 |
| 2006/0187825 | A1* | 8/2006 | Andersen | H04L 47/50 370/229 |
| 2006/0272018 | A1* | 11/2006 | Fouant | H04L 63/1416 726/23 |
| 2007/0094002 | A1* | 4/2007 | Berstis | G06F 9/5072 703/22 |
| 2008/0071403 | A1* | 3/2008 | Conway | C30B 1/02 700/97 |
| 2008/0085717 | A1* | 4/2008 | Chhabra | G06F 9/5011 455/450 |
| 2009/0003201 | A1* | 1/2009 | Horvitz | H04L 41/0896 370/229 |
| 2010/0017861 | A1* | 1/2010 | Krishnaswamy | H04W 48/18 726/7 |
| 2010/0094933 | A1* | 4/2010 | Hickson | G06Q 10/06 709/204 |

(Continued)

*Primary Examiner* — Jimmy H Tran
(74) *Attorney, Agent, or Firm* — Behmke Innovation Group LLC; James Behmke; Stephen D. LeBarron (57) ABSTRACT

In one aspect, a system for intelligent monitoring of a network device in a monitored environment includes a processor; a memory; and one or more modules stored in the memory and executable by a processor to perform operations including: capture network device application data for monitored application, capture network device resource data, generate model for transmitting performance data with minimum overhead based on captured network device resource data, and transmit data based on the model.

27 Claims, 7 Drawing Sheets

(56) References Cited

U.S. PATENT DOCUMENTS

| | | | |
|---|---|---|---|
| 2011/0136495 A1* | 6/2011 | Chen | H04L 5/001 455/450 |
| 2012/0209568 A1* | 8/2012 | Arndt | G06F 11/008 702/183 |
| 2012/0250649 A1* | 10/2012 | Goodwin | H04W 72/1226 370/329 |
| 2012/0272115 A1* | 10/2012 | Munson | H04L 1/0002 714/748 |
| 2014/0068069 A1* | 3/2014 | Bansal | H04L 43/022 709/224 |
| 2015/0092678 A1* | 4/2015 | Narasimha | H04W 76/14 370/329 |
| 2015/0195216 A1* | 7/2015 | Di Pietro | H04L 41/5025 370/252 |
| 2015/0332165 A1* | 11/2015 | Mermoud | G06N 5/048 706/12 |
| 2015/0333997 A1* | 11/2015 | Mermoud | H04L 43/12 370/252 |
| 2017/0017521 A1* | 1/2017 | Gupta | G06F 9/5011 |
| 2017/0104774 A1* | 4/2017 | Vasseur | G06N 99/005 |
| 2017/0177808 A1* | 6/2017 | Irwin | G06F 19/328 |
| 2017/0187588 A1* | 6/2017 | Nolan | H04W 4/70 |
| 2017/0192828 A1* | 7/2017 | Kwong | G06F 9/546 |
| 2017/0279830 A1* | 9/2017 | Mermoud | H04L 63/1458 |
| 2017/0279835 A1* | 9/2017 | Di Pietro | H04L 63/1425 |
| 2017/0353361 A1* | 12/2017 | Chopra | H04L 41/147 |
| 2017/0353477 A1* | 12/2017 | Faigon | H04L 63/1416 |
| 2018/0124086 A1* | 5/2018 | Flacher | H04L 63/1458 |
| 2018/0183660 A1* | 6/2018 | Byers | H04L 41/0853 |
| 2018/0198687 A1* | 7/2018 | Rao | H04L 41/16 |
| 2018/0205666 A1* | 7/2018 | Nash | H04L 67/32 |
| 2018/0220401 A1* | 8/2018 | Jeong | H04W 28/0268 |
| 2018/0240011 A1* | 8/2018 | Tan | G06F 17/18 |
| 2018/0253646 A1* | 9/2018 | Feng | G06N 3/084 |
| 2018/0278486 A1* | 9/2018 | Mermoud | H04L 41/16 |
| 2018/0278487 A1* | 9/2018 | Mermoud | H04L 29/06 |

* cited by examiner

INTELLIGENT DATA TRANSMISSION BY NETWORK DEVICE AGENT

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of intelligently monitoring a network device are disclosed. Specifically, the disclosed technology for intelligently monitoring a network device is used to transmit data from the network device based on a model that indicates a time for sending the data that minimizes resource usage and performance effects on the device.

In one aspect, a system for intelligent monitoring of a network device in a monitored environment is disclosed. The system includes a processor; a memory; and one or more modules stored in the memory and executable by a processor to perform operations. The operations include: capture network device application data for monitored application, capture network device resource data, generate model for transmitting performance data with minimum overhead based on captured network device resource data, and transmit data based on the model.

The system can be implemented in various ways to include one or more of the following features. The one or more modules can be executable to perform operations including: determining whether an event is detected that triggers immediate transmission of data, and if an event that triggers immediate transmission of data is detected, transmitting data immediately in response to the event. The one or more modules can be executable to perform operations including: determining whether the detected event is a local event or a request from a remote machine. The one or more modules can be executable to perform operations including: collecting training data based on the transmission of the data, the data transmitted based on the model. The one or more modules can be executable to perform operations including: capturing data regarding processor usage, memory usage, power usage, input received, sensor output, bandwidth and network latency, and errors and exceptions for the device.

In another aspect, a method for intelligent monitoring of a network device in a monitored environment is disclosed. The method includes: capturing network device application data for a monitored application by an agent on the network device, capturing network device resource data by the agent on the network device, generating a model for transmitting performance data to minimize resource usage based on the captured data, and transmitting the captured data at a time based on the model output to a remote machine.

The method can be implemented in various ways to include one or more of the following features. The method can include collecting training data based on the transmission of the data, the data transmitted based on the model. The method can include capturing data regarding processor usage, memory usage, power usage, input received, sensor output, bandwidth and network latency, and errors and exceptions for the device. The detected event may include a local event or a request from a remote machine.

In yet another aspect, a non-transitory computer readable medium embodying instructions when executed by a processor to cause operations to be performed for intelligent monitoring of a network device in a monitored environment is disclosed. The operations include: capturing network device application data for a monitored application by an agent on the network device, capturing network device resource data by the agent on the network device, generating a model for transmitting performance data to minimize resource usage based on the captured data, and transmitting the captured data at a time based on the model output to a remote machine.

The non-transitory computer readable medium can be implemented in various ways to include one or more of the following features. The operation can include collecting training data based on the transmission of the data transmitted based on the model. The operation can include capturing data regarding processor usage, memory usage, power usage, input received, sensor output, bandwidth and network latency, and errors and exceptions for the device. The detected event may include a local event or a request from a remote machine.

DETAILED DESCRIPTION

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. The web applications can be monitored on client machines, backend servers, and network devices such as smart appliances, parking meters, point of sale systems, and other devices Monitoring of network devices may be performed in an intelligent manner that minimizes the load and usage of device resources.

Intelligent Data Transmission by Network Device Agent Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to perform intelligent monitoring of network device. The disclosed technology provides the intelligent monitoring of a network device so that the monitoring and transmission of data based on the monitoring can be performed to minimize resource usage on the network device and have minimal impact on a user's experience with the device.

The network device being intelligently monitored can be a network device that communicates with other devices wirelessly. The wireless communication may be via a Wi-Fi signal, a BLUETOOTH radio frequency signal for communication with local devices, and wireless signals that may communicate via an IP based network. In some instances, a network device has a function that is separate from computation, such as for example a light, refrigerating perishable goods, securing a home, managing parking fees for a parking space, or some other function. The network device itself may be implemented as a smart appliance (e.g., smart light or smart refrigerator), home automation gateway, parking meter, point of sale device, automotive infotainment dashboard, farm tractor, or other device. Typically, such a network device has less processing power, memory, and bandwidth that other computing devices, such as for example laptop computers, tablet computers, smart phones, and other mobile devices, as well as other machines typically used for computing purposes. As such, typical monitoring processes applied to other computing devices with more powerful resources can negatively affect the performance of the network device more than other computer devices.

A model for determining a time at which resource usage is minimal, and at which data transmission is least likely to affect the network device, can be generated from historical behavior and performance data for the network device. Based on the model, a time is selected at which transmitting data from the network device to a remote machine, such as controller 790, will have minimal effect on the performance of the device. In some instances, there are scenarios where data may be sent immediately or as soon as possible rather than based on the model, such as for example in response to an error or exception detected in a device application, and anomaly detected based on monitoring the device application, or a request received from an external server such as controller 790. In some instances, the model will select a most suitable time to transmit data within a particular time window, wherein the time window may be associated with the maximum storage capability or allocated storage for the network device, to avoid losing data.

Intelligently Monitoring a Network Device Process

FIGS. 1-5 are process flow diagrams of exemplar processes 100, 102, 104, 106, and 108 for intelligently monitoring a network device. As discussed further with respect to FIGS. 6-8, performance issues with a monitored environment are detected by monitoring applications and entities, such as transactions, tiers, nodes, and machines in the monitored environment using agents installed at individual machines at the entities. For example, each node can include one or more machines that perform part of the applications. The agents collect data associated with the applications of interest and associated nodes and machines where the applications are being operated. Examples of the collected data include performance data, such as metrics, metadata, and topology data that indicate relationship information.

Figure 1:
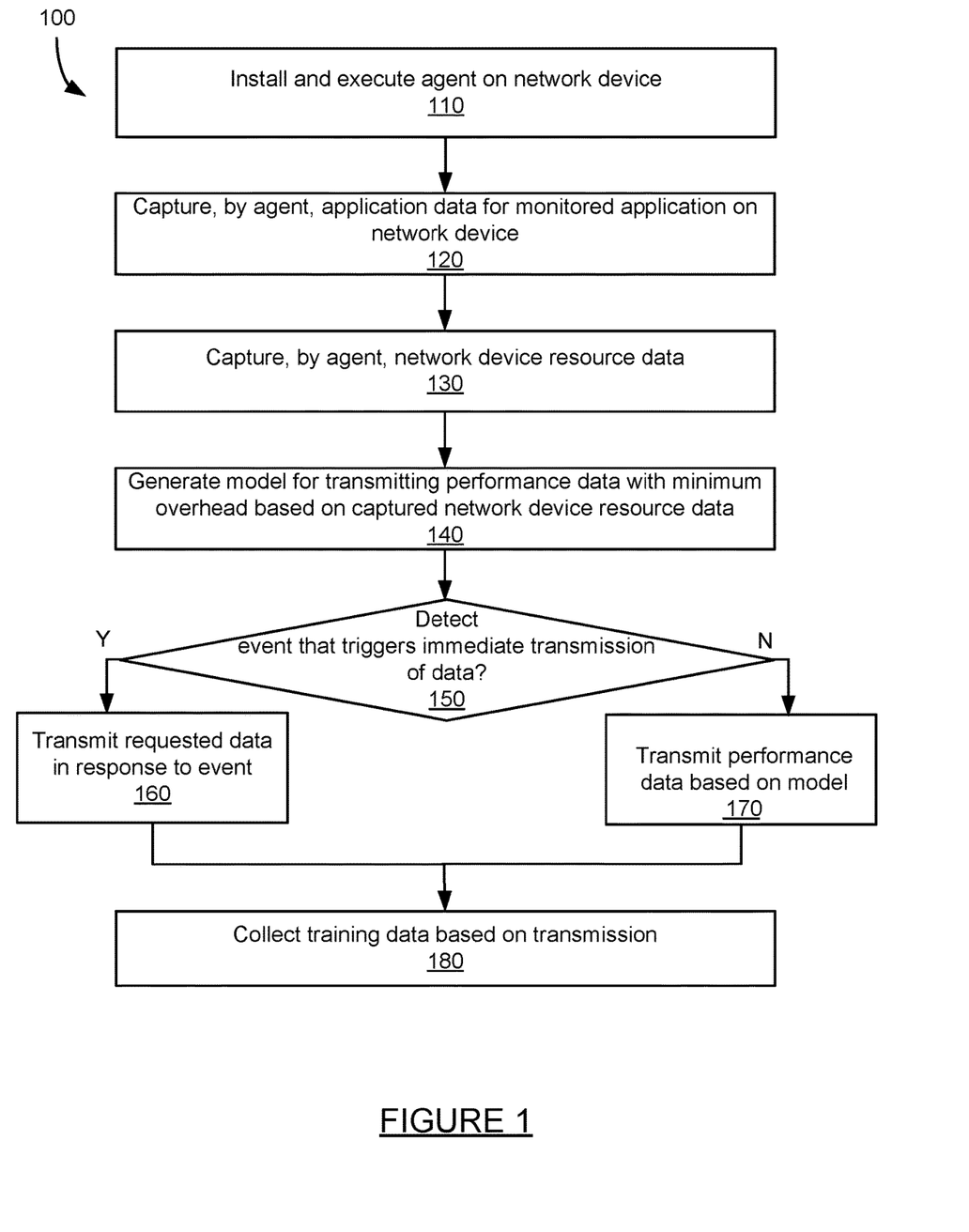
FIGS. 1-5 are process flow diagrams of exemplar processes for intelligently monitoring a network device

In the exemplary process 100 FIG. 1, agents may be installed and executed on a network device at step 110. The agents may be installed wirelessly, for example over a Wi-Fi network, via a BLUETOOTH network, or in some other manner. An agent may capture application data for a monitored application on the network device at step 120. The agents may also capture network device resource data at step 130. A model may be generated for transmitting performance data with a minimum overhead based on captured network device resource data at step 140. The model may determine and output a time within a time window to transmit data in order to minimize resource usage based on captured performance and resource data. In some instances, the model can generate a remedy for an anomaly, error or other detected issue with an application on the device. The model can be specific to the local device application and can consist of a machine learning algorithm such as for example k nearest neighbor (kNN), reinforcement learning, regression, neural networks, and support vector machines. The model may be used to determine when to transmit output to a remote machine based on training data of input and output. A determination may be made as to whether an event that triggers an immediate transmission of data is detected at step 150. If no event is detected that requires immediate transmission of data, and performance data is transmitted at step 170. In some instances, training data can be sent along with the data or may not be sent with the data. The transmission may be made to a remote machine, such as controller 790 or data collection 795. Training data regarding the transmission is then collected at step 180. If an event that triggers an immediate transmission is detected at step 750, the requested data associated with the detected event is transmitted in response to the event at step 160. Training data based on the transmission is collected at step 180.

Figure 2:
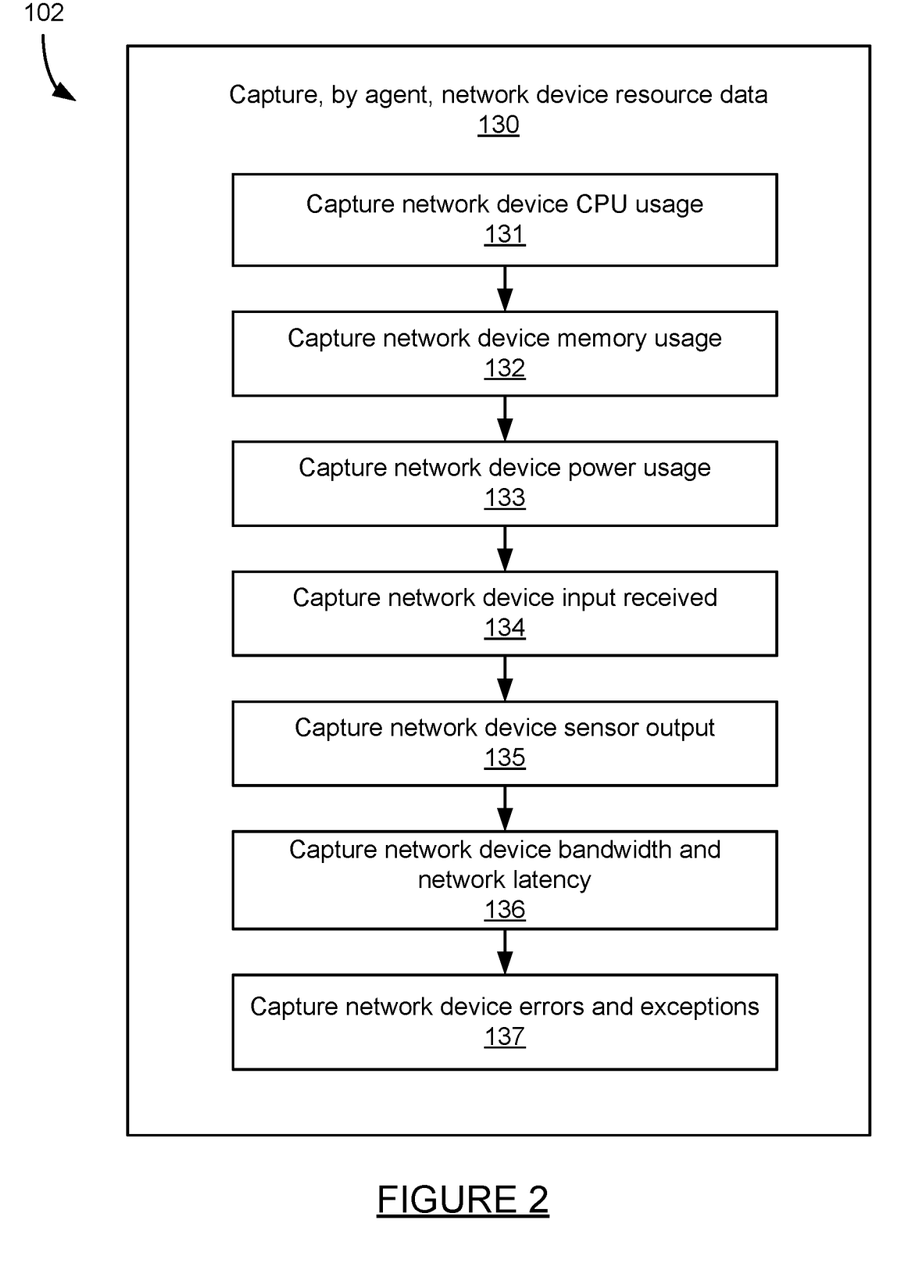

Capturing network device resource data can include additional features as illustrated in the exemplary process 102 of FIG. 2. For example, network device CPU usage may be captured at step 131. The network device memory usage may be captured at step 132. Power usage for the network device may be captured at step 133. Inputs received by the network device may be captured at step 134. An output of a sensor, such as for example an accelerometer, may be captured at step 135 device bandwidth and network latency be captured at step 136. Device errors and exceptions may be captured at step 137. Data for other resources within network device 713 may be captured in addition to or in place of those listed in process 102.

Figure 3:
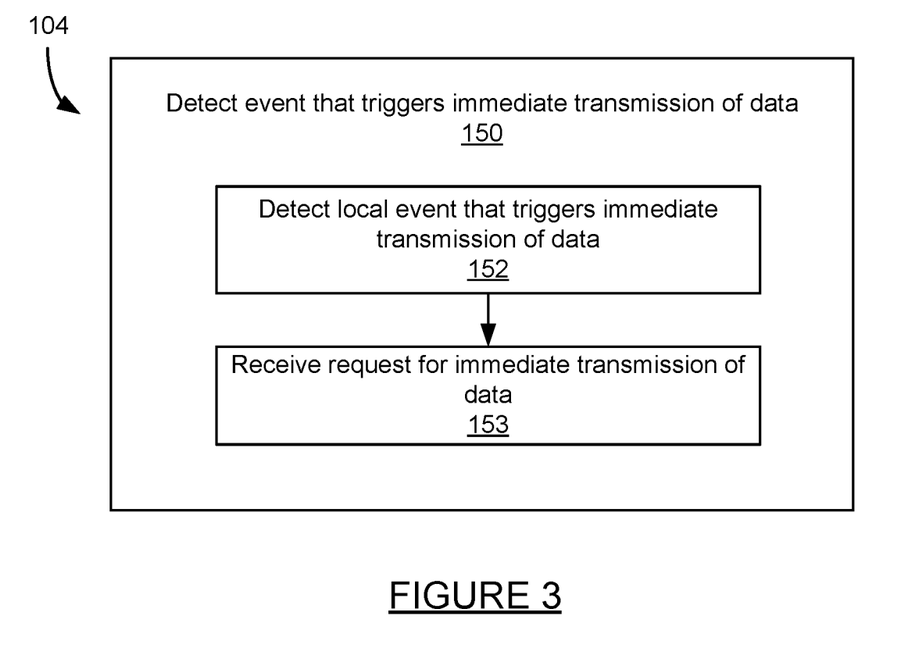

Detecting an event that triggers an immediate transmission of data can include additional features as illustrated in the exemplary process 104 of FIG. 3. For example, a local event may be detected that triggers immediate transmission of data at step 152. A request for an immediate transmission may be received at step 153. A request for an immediate transmission may include a request from a controller 790 or data collection 795. The request may be based on previous data sent by device 713 to controller, which is analyzed further by controller 790. The request may also be based on data associated with a distributed transaction of which an application on device 713 is associated with. The requested data may include data associated with a particular time, function, application, or other parameters.

Figure 4:
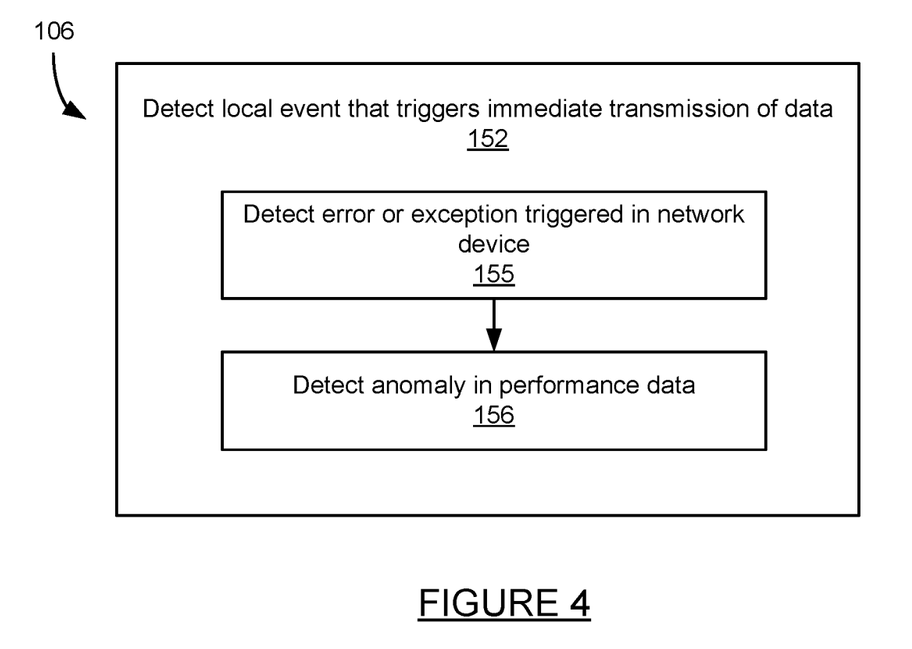

Detecting a local event that triggers an immediate transmission of data can include additional features as illustrated in exemplary process 106 of FIG. 4. For example, local events to the network device may include errors or exceptions that are triggered and detected in the network device at step 155. Anomalies in performance data that is analyzed at the network device may be detected at step 156.

Figure 5:
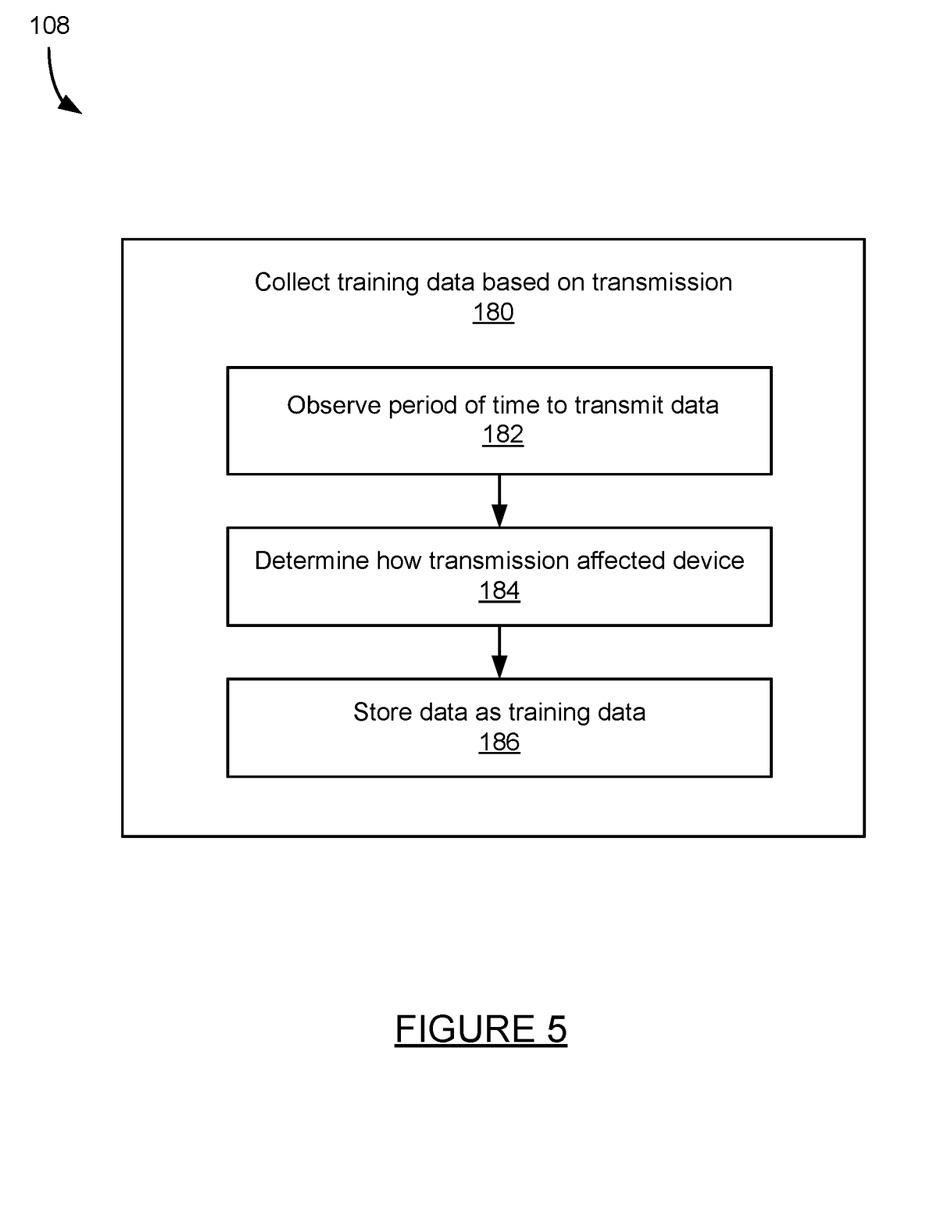

Collecting training data based on a transmission can include additional features as illustrated in exemplary process 108 of FIG. 5. A period of time to transmit data may be observed and/or monitored at step 182. A determination is made as to how the transmission affects the device at step 184. Transmission may affect the device by slowing the processing of one or more other applications, adding to network latency, and using processing cycles, memory usage, and power. The determined data may be stored as training data at step 186.

Application Intelligence Platform Architecture

Figure 6:
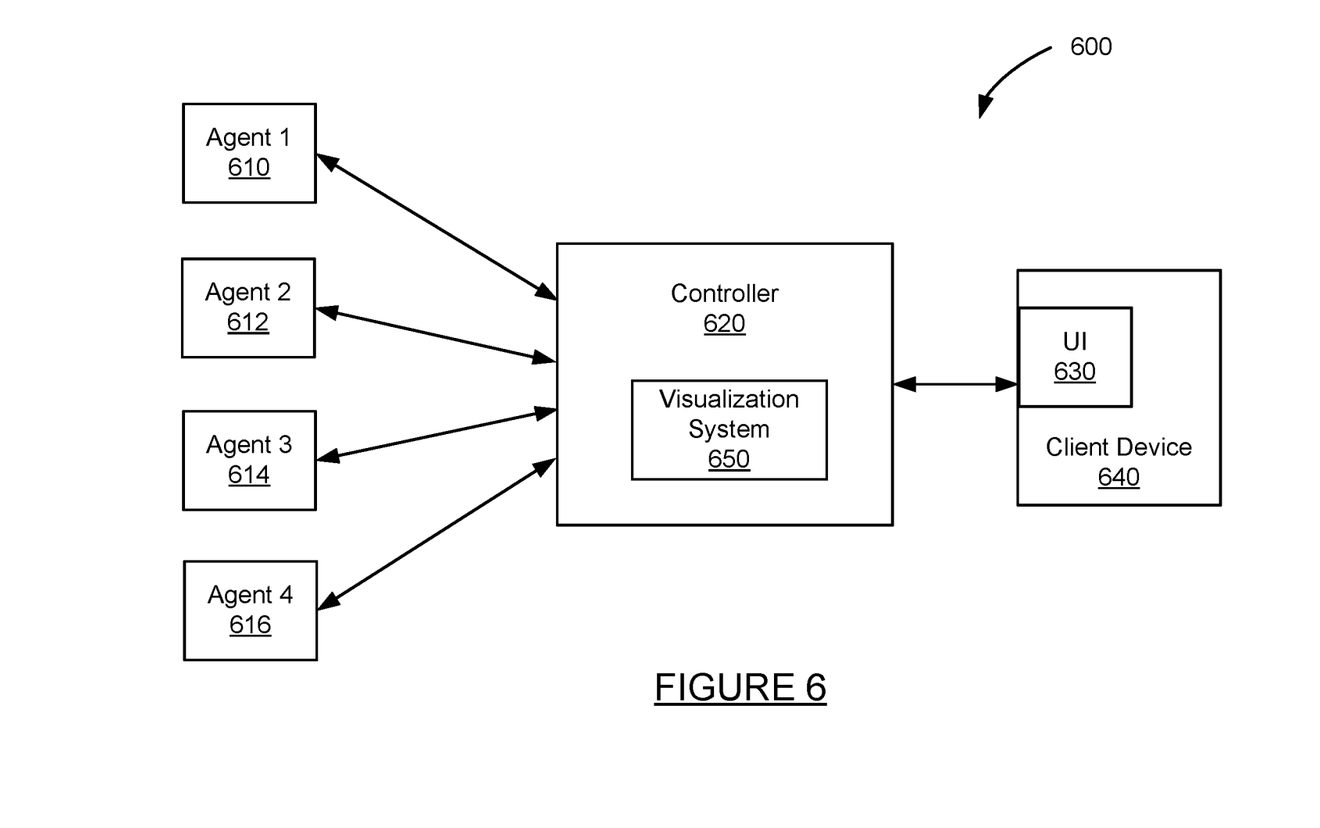
FIG. 6 is a block diagram of an exemplary application intelligence platform that can intelligently monitor a network device as disclosed in this patent document, including the processes disclosed with respect to FIGS. 1-5.

FIG. 6 is a block diagram of an exemplary application intelligence platform 600 that can implement intelligent monitoring of a network device in a monitored environment as disclosed in this patent document. The application intelligence platform is a system that monitors and collect metrics of performance data for an application environment being monitored. At the simplest structure, the application intelligence platform includes one or more agents 610, 612, 614, 616 and one or more controllers 620. While FIG. 6 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 620 is the central processing and administration server for the application intelligence platform. The controller 320 serves a browser-based user interface (UI) 630 that is the primary interface for monitoring, analyzing, and troubleshooting the monitored environment. The controller 620 can control and manage monitoring of business transactions distributed over application servers. Specifically, the controller 620 can receive runtime data from agents 610, 612, 614, 616 and coordinators, associate portions of business transaction data, communicate with agents to configure collection of runtime data, and provide performance data and reporting through the interface 630. The interface 630 may be viewed as a web-based interface viewable by a client device 640. In some implementations, a client device 640 can directly communicate with controller 620 to view an interface for monitoring data.

In the Software as a Service (SaaS implementation, a controller instance 620 is hosted remotely by a provider of the application intelligence platform 600. In the on-premise (On-Prem) implementation, a controller instance 620 is installed locally and self-administered.

The controllers 620 receive data from different agents 610, 612, 614, 616 deployed to monitor applications, databases and database servers, servers, and end user clients for the monitored environment. Any of the agents 610, 612, 614, 616 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 610, 612, 614, 616) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 620 can include a visualization system 650 for displaying the reports generated by the Reporters at the browser agents as disclosed in this patent document. In some implementations, the visualization system 650 can be implemented in a separate machine (e.g., a server) different from the one hosting the controller 620.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 7:
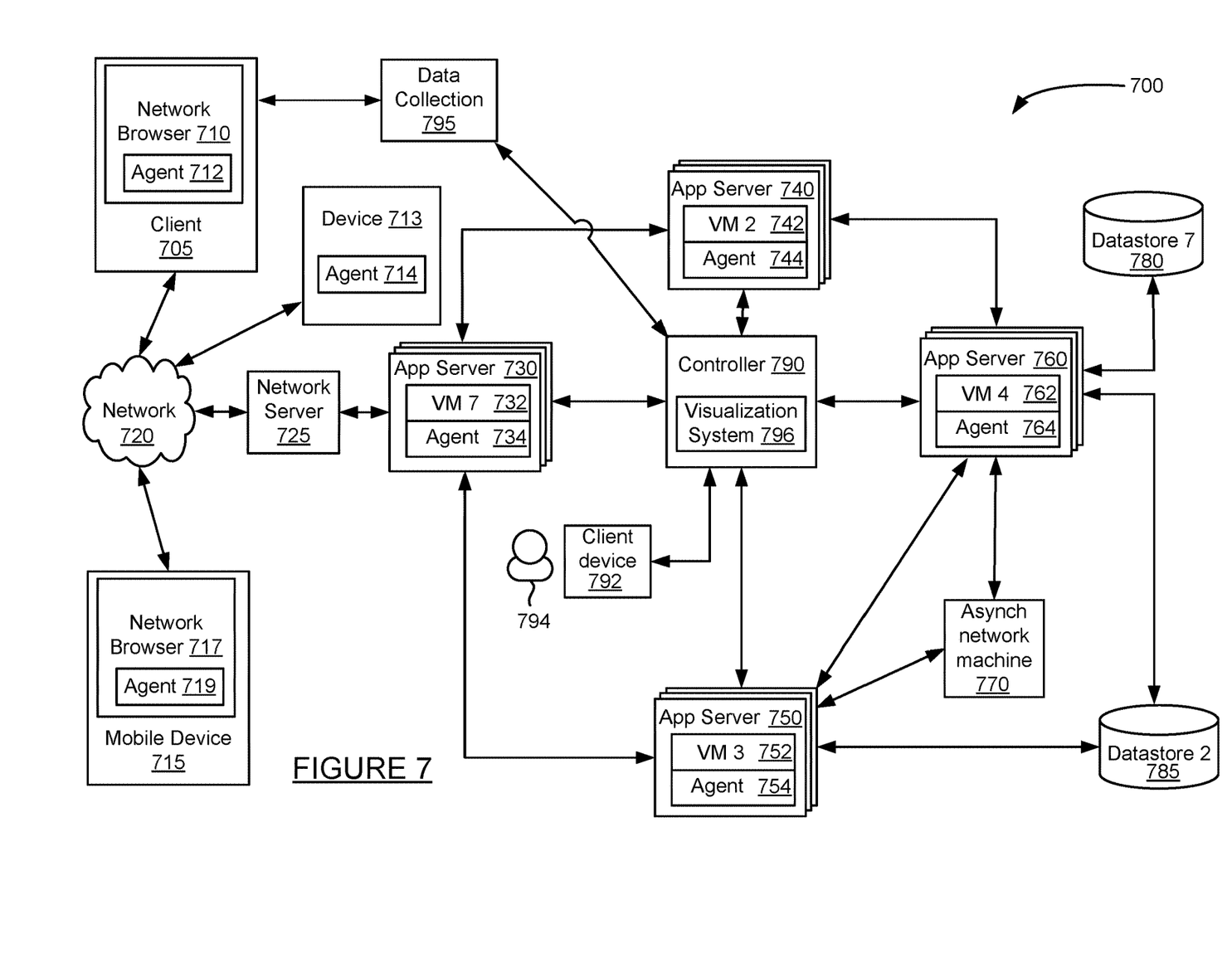
FIG. 7 is a block diagram of an exemplary system for intelligently monitoring a network device as disclosed in this patent document, including the processes disclosed with respect to FIGS. 1-5.

FIG. 7 is a block diagram of an exemplary system 400 for intelligent monitoring of a network device in a monitored environment as disclosed in this patent document, including the processes disclosed with respect to FIGS. 1-5. The system 700 in FIG. 7 includes client device 705 and 792, mobile device 715, network 720, network server 725, application servers 730, 740, 750 and 760, asynchronous network machine 770, data stores 780 and 785, controller 790, and data collection server 795. The controller 790 can include visualization system 796 for providing displaying of the report generated by the Reporters at the browser agents as disclosed in this patent document. In some implementations, the visualization system 796 can be implemented in a separate machine (e.g., a server) different from the one hosting the controller 790.

Client device 705 may include network browser 710 and be implemented as a computing device, such as for example a laptop, desktop, workstation, or some other computing device. Network browser 710 may be a client application for viewing content provided by an application server, such as application server 730 via network server 725 over network 720.

Network browser 710 may include agent 712. Agent 712 may be installed on network browser 710 and/or client 705 as a network browser add-on, downloading the application to the server, or in some other manner. Agent 712 may be executed to monitor network browser 710, the operating system of client 705, and any other application, API, or another component of client 705. Agent 712 may determine network browser navigation timing metrics, access browser cookies, monitor code, and transmit data to data collection 760, controller 790, or another device. Agent 712 may perform other operations related to monitoring a request or a network at client 705 as discussed herein including report generating.

Mobile device 715 is connected to network 720 and may be implemented as a portable device suitable for sending and receiving content over a network, such as for example a mobile phone, smart phone, tablet computer, or other portable device. Both client device 705 and mobile device 715 may include hardware and/or software configured to access a web service provided by network server 725.

Mobile device 715 may include network browser 717 and an agent 719. Mobile device may also include client applications and other code that may be monitored by agent 719. Agent 719 may reside in and/or communicate with network browser 717, as well as communicate with other applications, an operating system, APIs and other hardware and software on mobile device 715. Agent 719 may have similar functionality as that described herein for agent 712 on client 705, and may repot data to data collection server 760 and/or controller 790.

Device 713 may be implemented as a network device that communicates with other devices over network 720. Device 713 may be communicatively coupled to network 720 via a wireless network, such as for example a WiFi network. Device 710 may also communicate with devices wirelessly via radio frequency networks, such as for example via a BLUETOOTH communication protocol. Device 710 may include one or more applications and one or more agents 711. Agent 711 may be executed to monitor a device application, operating system, resources such as processor, memory, and power usage, network latency and bandwidth, sensors and inputs, API, or another component of device 713. Agent 712 may monitor code, generate performance data from the monitored code, and transmit data to data collection 760, controller 790, or another device. Agent 712 may perform other operations related to monitoring a request or a network at device 713 as discussed herein including report generating.

Network 720 may facilitate communication of data among different servers, devices and machines of system 700 (some connections shown with lines to network 720, some not shown). The network may be implemented as a private network, public network, intranet, the Internet, a cellular network, Wi-Fi network, VoIP network, or a combination of one or more of these networks. The network 720 may include one or more machines such as load balance machines and other machines.

Network server 725 is connected to network 720 and may receive and process requests received over network 720. Network server 725 may be implemented as one or more servers implementing a network service, and may be implemented on the same machine as application server 730 or one or more separate machines. When network 720 is the Internet, network server 725 may be implemented as a web server.

Application server 730 communicates with network server 725, application servers 740 and 750, and controller 790. Application server 750 may also communicate with other machines and devices (not illustrated in FIG. 7). Application server 730 may host an application or portions of a distributed application. The host application 732 may be in one of many platforms, such as including a Java, PHP, .Net, and Node.JS, be implemented as a Java virtual machine, or include some other host type. Application server 730 may also include one or more agents 734 (i.e. "modules"), including a language agent, machine agent, and network agent, and other software modules. Application server 730 may be implemented as one server or multiple servers as illustrated in FIG. 7.

Application 732 and other software on application server 730 may be instrumented using byte code insertion, or byte code instrumentation (BCI), to modify the object code of the application or other software. The instrumented object code may include code used to detect calls received by application 732, calls sent by application 732, and communicate with agent 734 during execution of the application. BCI may also be used to monitor one or more sockets of the application and/or application server in order to monitor the socket and capture packets coming over the socket.

In some embodiments, server 730 may include applications and/or code other than a virtual machine. For example, servers 730, 740, 750, and 760 may each include Java code, .Net code, PHP code, Ruby code, C code, C++ or other binary code to implement applications and process requests received from a remote source. References to a virtual machine with respect to an application server are intended to be for exemplary purposes only.

Agents 734 on application server 730 may be installed, downloaded, embedded, or otherwise provided on application server 730. For example, agents 734 may be provided in server 730 by instrumentation of object code, downloading the agents to the server, or in some other manner. Agent 734 may be executed to monitor application server 730, monitor code running in a virtual machine 732 (or other program language, such as a PHP, .Net, or C program), machine resources, network layer data, and communicate with byte instrumented code on application server 730 and one or more applications on application server 730.

Each of agents 734, 744, 754 and 764 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 734 may detect operations such as receiving calls and sending requests by application server 730, resource usage, and incoming packets. Agent 734 may receive data, process the data, for example by aggregating data into metrics, and transmit the data and/or metrics to controller 790. Agent 734 may perform other operations related to monitoring applications and application server 730 as discussed herein. For example, agent 734 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 790 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 734 may create a request identifier for a request received by server 730 (for example, a request received by a client 705 or 715 associated with a user or another source). The request identifier may be sent to client 705 or mobile device 715, whichever device sent the request. In embodiments, the request identifier may be created when a data is collected and analyzed for a particular business transaction.

Each of application servers 740, 750 and 760 may include an application and agents. Each application may run on the corresponding application server. Each of applications 742, 752 and 762 on application servers 740-560 may operate similarly to application 732 and perform at least a portion of a distributed business transaction. Agents 744, 754 and 764 may monitor applications 742-562, collect and process data at runtime, and communicate with controller 790. The applications 732, 742, 752 and 762 may communicate with each other as part of performing a distributed transaction. In particular, each application may call any application or method of another virtual machine.

Asynchronous network machine 770 may engage in asynchronous communications with one or more application servers, such as application server 750 and 760. For example, application server 750 may transmit several calls or messages to an asynchronous network machine. Rather than communicate back to application server 750, the asynchronous network machine may process the messages and eventually provide a response, such as a processed message, to application server 760. Because there is no return message from the asynchronous network machine to application server 750, the communications among them are asynchronous.

Data stores 780 and 785 may each be accessed by application servers such as application server 750. Data store 785 may also be accessed by application server 750. Each of data stores 780 and 785 may store data, process data, and return queries received from an application server. Each of data stores 780 and 785 may or may not include an agent.

Controller 790 may control and manage monitoring of business transactions distributed over application servers 730-560. In some embodiments, controller 790 may receive application data, including data associated with monitoring client requests at client 705 and mobile device 715, from data collection server 760. In some embodiments, controller 790 may receive application monitoring data and network data from each of agents 712, 719, 734, 744 and 754. Controller 790 may associate portions of business transaction data, communicate with agents to configure collection of data, and provide performance data and reporting through an interface. The interface may be viewed as a web-based interface viewable by client device 792, which may be a mobile device, client device, or any other platform for viewing an interface provided by controller 790. In some embodiments, a client device 792 may directly communicate with controller 790 to view an interface for monitoring data.

Client device 792 may include any computing device, including a mobile device or a client computer such as a desktop, work station or other computing device. Client computer 792 may communicate with controller 790 to create and view a custom interface. In some embodiments, controller 790 provides an interface for creating and viewing the custom interface as a content page, e.g., a web page, which may be provided to and rendered through a network browser application on client device 792.

Applications 732, 742, 752 and 762 may be any of several types of applications. Examples of applications that may implement applications 732-562 include a Java, PHP, .Net, Node.JS, and other applications.

Figure 8:
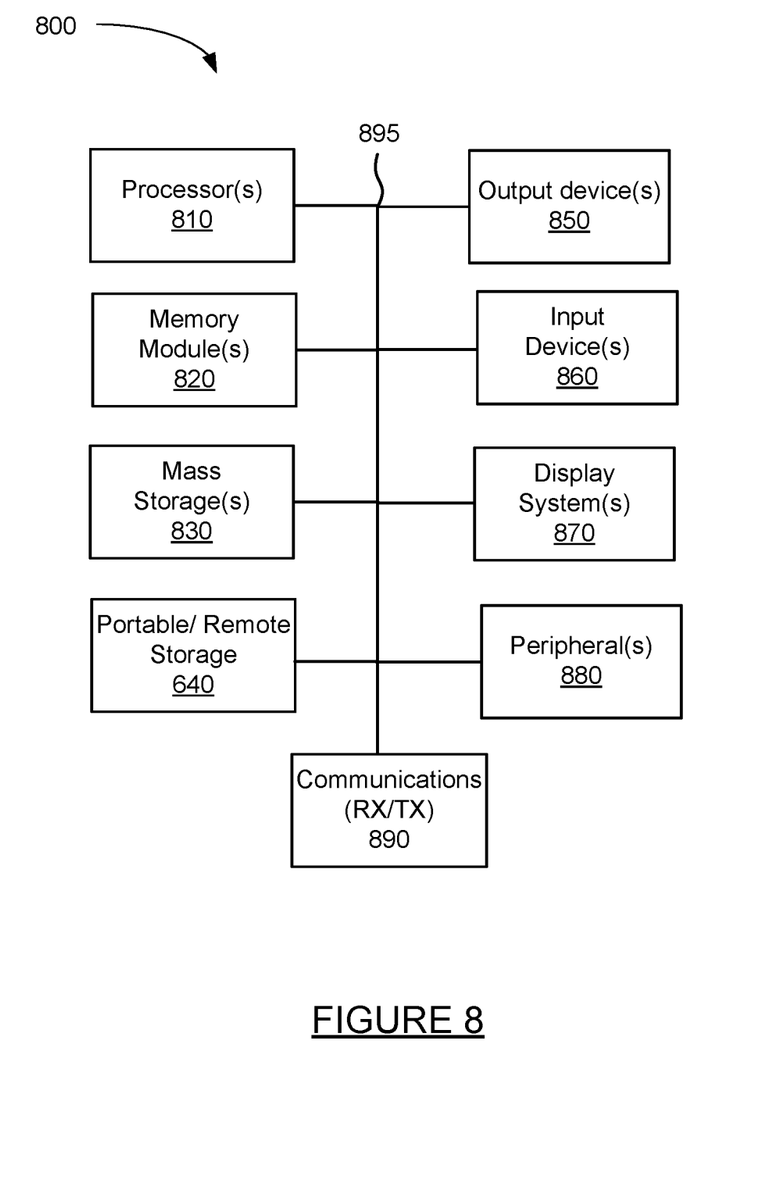
FIG. 8 is a block diagram of an exemplary computing system implementing the disclosed technology.

FIG. 8 is a block diagram of a computer system 800 for implementing the present technology. System 800 of FIG. 8 may be implemented in the contexts of the likes of clients 805, 892, network server 825, servers 830, 840, 850, 860, a synchronous network machine 870 and controller 890.

The computing system 800 of FIG. 8 includes one or more processors 810 and memory 820. Main memory 820 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable or remote storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a compact disk, digital video disk, magnetic disk, flash storage, etc. to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 800 of FIG. 8 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for intelligent monitoring of a network device in a monitored environment, the system including:
    a processor;
    a memory; and
    one or more modules stored in the memory and executable by a processor to perform operations including:
        capture network device application data for a monitored application;
        capture network device resource data;
        generate a machine learning-based model for transmitting performance data based on the captured network device resource data, the machine learning-based model indicative of when to transmit the performance data in order to minimize resource usage; and
        transmit the performance data at time, selected by the machine learning-based model, within a time window that is associated with a maximum storage capability of the network device to a remote machine, the performance data including the captured network device application data and the captured network device resource data.

2. The system of claim 1, wherein the transmitted data includes the performance data and training sample data.

3. The system of claim 1, wherein the one or more modules are executable by a processor to perform operations including:
    determining whether an event is detected that triggers immediate transmission of data; and
    if an event that triggers the immediate transmission of data is detected, transmitting data immediately in response to the event.

4. The system of claim 3, wherein the event may include a local event or a request from the remote machine.

5. The system of claim 4, wherein the local event may include an error or exception within an application or an anomaly detected in a monitored application.

6. The system of claim 1, wherein the one or more modules are executable by a processor to perform operations including collecting training data based on the transmission of the data transmitted based on the machine learning-based model.

7. The system of claim 6, wherein the collecting training data includes determining the time and processing data required to perform the transmission.

8. The system of claim 1, wherein the capture network device resource data includes capturing data regarding processor usage, memory usage, power usage, input received, sensor output, bandwidth and network latency, and errors and exceptions for the device.

9. The system of claim 1, wherein the network device includes a smart appliance, parking meter, point of sale device, or a home automation gateway device.

10. A method for intelligent monitoring of a network device in a monitored environment, the method comprising:
    capturing network device application data for a monitored application by an agent on the network device;
    capturing network device resource data by the agent on the network device;
    generating a machine learning-based model for transmitting performance data based on the captured network device resource data, the machine learning-based model indicative of when to transmit the performance data in order to minimize resource usage; and
    transmitting the performance data at time, selected by the machine learning-based model, within a time window that is associated with a maximum storage capability of the network device to a remote machine, the performance data including the captured network device application data and the captured network device resource data.

11. The method of claim 10, wherein the transmitted data includes the performance data and training sample data.

12. The method of claim 10, further comprising:
    determining whether an event is detected that triggers immediate transmission of data; and
    if an event that triggers the immediate transmission of data is detected, transmitting data immediately in response to the event.

13. The method of claim 12, wherein the event may include a local event or a request from the remote machine.

14. The method of claim 13, wherein the local event may include an error or exception within an application or an anomaly detected in a monitored application.

15. The method of claim 10, further comprising:
collecting training data based on the transmission of the data transmitted based on the machine learning-based model.

16. The method of claim 15, wherein the collecting training data includes determining the time and processing data required to perform the transmission.

17. The method of claim 10, wherein the capturing network device resource data includes capturing data regarding processor usage, memory usage, power usage, input received, sensor output, bandwidth and network latency, and errors and exceptions for the device.

18. The method of claim 10, wherein the network device includes one of a smart appliance, parking meter, point of sale device, and a home automation gateway device.

19. A non-transitory computer readable medium embodying instructions when executed by a processor to cause operations to be performed for intelligent monitoring of a network device in a monitored environment, the operations comprising:
capturing network device application data for a monitored application by an agent on the network device;
capturing network device resource data by the agent on the network device;
generating a machine learning-based model for transmitting performance data based on the captured network device resource data to report data based, the machine learning-based model indicative of when to transmit the performance data in order to minimize resource usage; and
transmitting the performance data at time, selected by the machine learning-based model, within a time window that is associated with a maximum storage capability of the network device to a remote machine, the performance data including the captured network device application data and the captured network device resource data.

20. The non-transitory computer readable medium of claim 19, wherein the transmitted data includes the performance data and training sample data.

21. The non-transitory computer readable medium of claim 19, further comprising:
determining whether an event is detected that triggers immediate transmission of data; and
if an event that triggers the immediate transmission of data is detected, transmitting data immediately in response to the event.

22. The non-transitory computer readable medium of claim 21, wherein the event may include a local event or a request from the remote machine.

23. The non-transitory computer readable medium of claim 22, wherein the local event may include an error or exception within an application or an anomaly detected in a monitored application.

24. The non-transitory computer readable medium of claim 19, further comprising:
collecting training data based on the transmission of the data transmitted based on the machine learning-based model.

25. The non-transitory computer readable medium of claim 24, wherein the collecting training data includes determining the time and processing data required to perform the transmission.

26. The non-transitory computer readable medium of claim 19, wherein the capturing network device resource data includes capturing data regarding processor usage, memory usage, power usage, input received, sensor output, bandwidth and network latency, and errors and exceptions for the device.

27. The non-transitory computer readable medium of claim 19, wherein the network device includes one of a smart appliance, parking meter, point of sale device, and a home automation gateway device.

* * * * *